United States Patent [19]

Hondzinski et al.

[11] Patent Number: 4,683,668
[45] Date of Patent: Aug. 4, 1987

[54] ROTATABLE SIDE BLOWER FOR AIR DRYING VEHICLES

[76] Inventors: Leonard J. Hondzinski, 53299 Aulgur Dr., Rochester, Mich. 48064; Robert A. Wrest, 1761 Orion Rd., Lake Orion, Mich. 48035

[21] Appl. No.: 851,942
[22] Filed: Apr. 14, 1986
[51] Int. Cl.⁴ .............................................. F26B 19/00
[52] U.S. Cl. ....................................... 34/229; 34/232; 34/243 C; 239/446; 239/447
[58] Field of Search ................. 34/222, 223, 224, 225, 34/229, 230, 232, 233, 243 C; 239/392, 393, 394, 587, 446, 447

[56] References Cited

U.S. PATENT DOCUMENTS

| | | | |
|---|---|---|---|
| 2,949,678 | 8/1960 | Anderson | 34/229 |
| 3,279,093 | 10/1966 | Dutton | 34/243 C |
| 3,806,985 | 4/1974 | Takeuchi | 34/243 C |
| 3,808,703 | 5/1974 | Kamiya | 34/243 C |
| 4,558,526 | 12/1985 | Baus | 34/233 |
| 4,594,797 | 6/1986 | Houck | 34/225 |

Primary Examiner—Albert J. Makay
Assistant Examiner—David W. Westphal
Attorney, Agent, or Firm—Reising, Ethington, Barnard, Perry & Milton

[57] ABSTRACT

A vehicle drying assembly (10) for air drying freshly washed vehicles which comprises a top blower (12) for downwardly discharging air above the vehicle for drying the top of the vehicle and a side blower (14) for discharging air transversely to the vehicle for drying the sides of the vehicle. A frame (16) through which the vehicles may be moved structurally supports the top blower (12) and the side blower (14). A fan (54) driven by a motor (56) supplies air under pressure to the top blower (12) and side blower (14). An air cylinder (20) and a rotation belt (21) selectively positions the side blower (14). The side blower (14) includes an outer rotatable tube (26) rotatable with respect to a fixed inner member (14) for alternatively discharging air through at least two openings (28).

45 Claims, 11 Drawing Figures

ROTATABLE SIDE BLOWER FOR AIR DRYING VEHICLES

TECHNICAL FIELD

The subject invention relates to an apparatus for air drying vehicles and, particularly, an apparatus utilized as a car/van dryer.

BACKGROUND ART

Conventional dryers for air drying freshly washed vehicles deliver a high-velocity stream of air through ducting to nozzles which direct the stream of air onto a wet vehicle to remove the water. This has been accomplished by passing a vehicle beneath an elongated top nozzle which extends transversely between an overhead structural frame and directs the air obliquely downward. Vertical side nozzles are also supported by the structural frame and are each directed inwardly toward the other side nozzle.

The problem with such air-drying systems is that the air nozzles have been rigidly secured to the structural frame, rendering them incapable of accommodating various vehicle heights and widths. Thus, the nozzle for a smaller vehicle of limited width may physically contact a vehicle of larger width when dried. Also, the air nozzles are usually of one height, rendering them inefficient to dry vehicles of various heights.

STATEMENT OF INVENTION AND ADVANTAGES

A vehicle drying assembly for air drying freshly washed vehicles comprises side blowing means for discharging air transversely to the vehicle for drying the sides of the vehicle. A frame through which the vehicles may be moved structurally supports the side blowing means. An air supply means is used for supplying air under pressure to the top blowing means and the side blowing means. The side blowing means includes an outer rotatable tube rotatable with respect to a fixed inner member for alternatively discharging air through at least two openings.

Accordingly, the subject invention may be utilized for efficiently removing water from vehicles of various heights and widths. The subject invention allows for maintaining close distances between the nozzles and the vehicle without danger of the nozzles contacting the vehicle.

FIGURES IN THE DRAWINGS

Other advantages of the present invention will be readily appreciated as the same becomes better understood by reference to the following detailed description when considered in connecting with the accompanying drawings wherein.

DESCRIPTION OF THE PREFERRED EMBODIMENT

Figure 1:
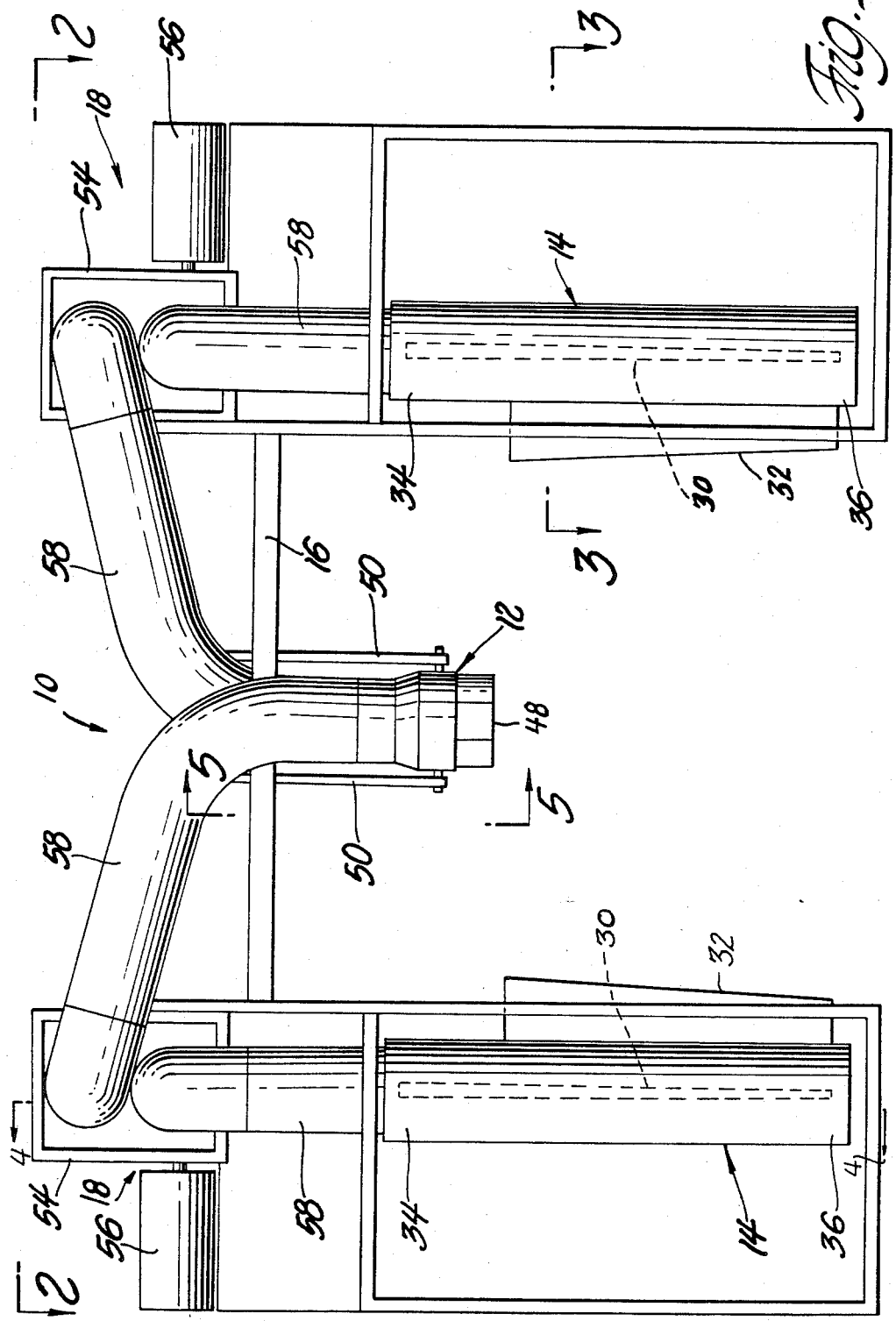
FIG. 1 is an elevational front view of the subject invention.
Figure 2:
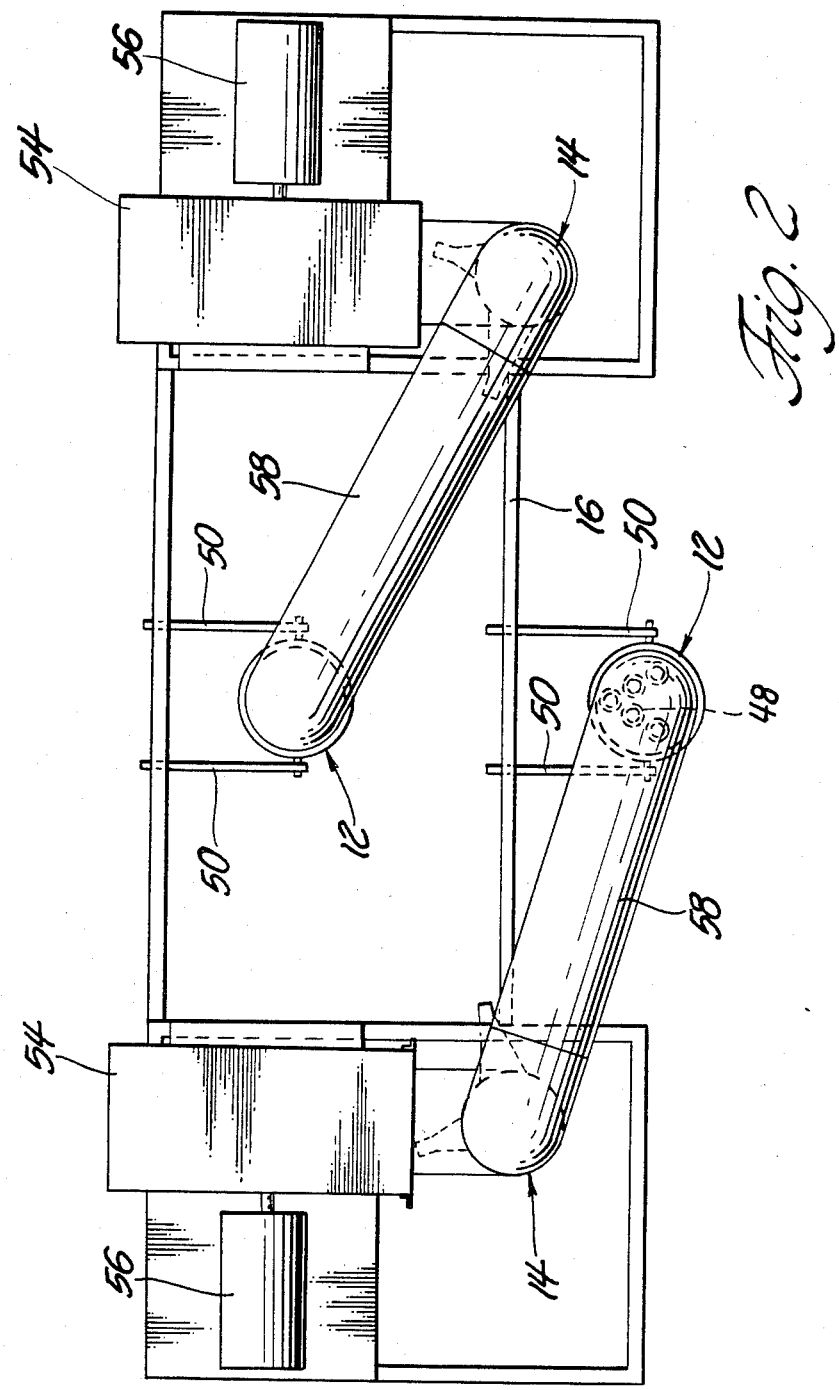
FIG. 2 is a top plan view of the subject invention taken substantially along line 2—2 of FIG. 1.

A vehicle drying assembly utilizing the subject invention for air drying (i.e., removing water) freshly washed vehicles is generally shown at 10 in FIGS. 1 and 2. The assembly 10 comprises top blowing means 12 for downwardly discharging air above and parallel to the top of roof of the vehicle, side blowing means 14 for discharging air transversely or perpendicularly to the vehicle for drying the sides of the vehicle, and a frame 16 structurally supporting the top blowing means 12 and side blowing means 14. The structural frame 16 may have a tunnel through which vehicles may be moved. In other words, the structural frame 16 may consist of two vertical towers with a hollow bridge extending transversely between the towers to support the top blowing means 12 and side blowing means 14, allowing a vehicle to move between the two towers. The assembly 10 includes air supply means 18 for supplying air under pressure to the top blowing means 12 and side blowing means 14. The assembly 10 includes rotatable means 20 for selectively rotating or selectively positioning of the side blowing means 14.

The side blowing means 14 comprises a fixed or stationary inner member 22 which is tubular and has at least one aperture or orifice 24 for allowing air to exit or be discharged from the fixed inner member 22. The side blowing means 14 further comprises an outer rotatable tube 26 rotatable with respect to the axis of the fixed inner member 22. The rotatable outer tube 26 has at least two, preferably a plurality of, discharge openings 28 for allowing air to exit from the fixed inner member 22. In other words, the outer rotatable tube 26 is rotatable with respect to the fixed inner member 22 for alternatively discharging air through at least two openings 28.

Figure 3:
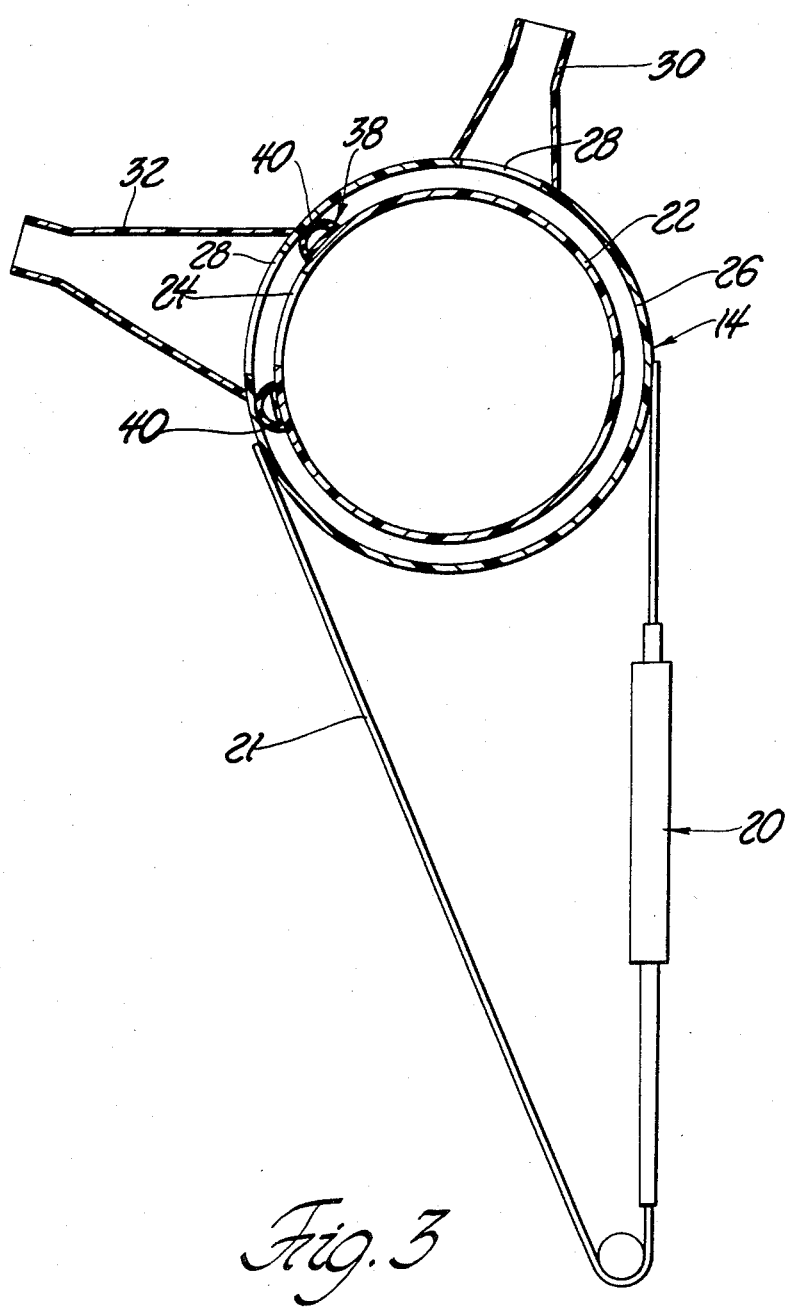
FIG. 3 is a cross-sectional view of the subject invention taken substantially along lines 3—3 of FIG. 1.
Figure 4:
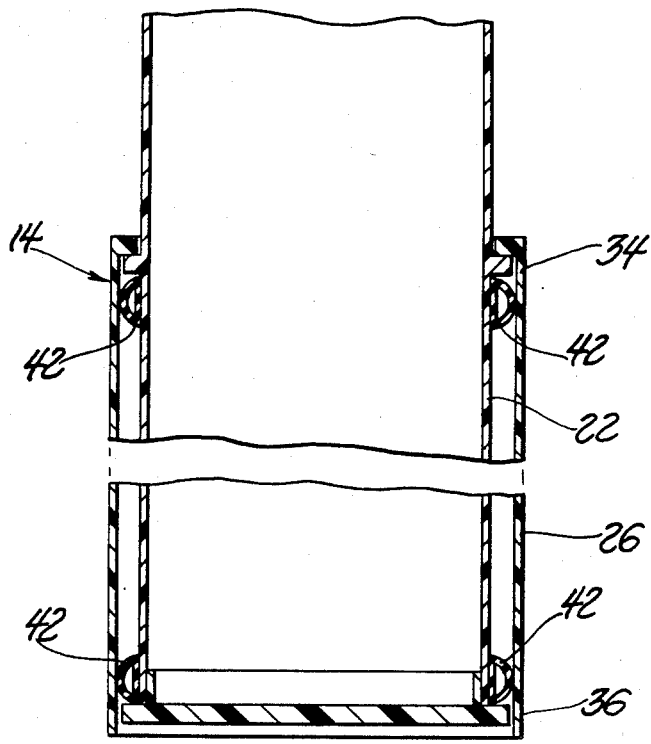
FIG. 4 is a fragmentary cross-sectional view of the subject invention taken substantially along lines 4—4 of FIG. 1.
Figure 5:
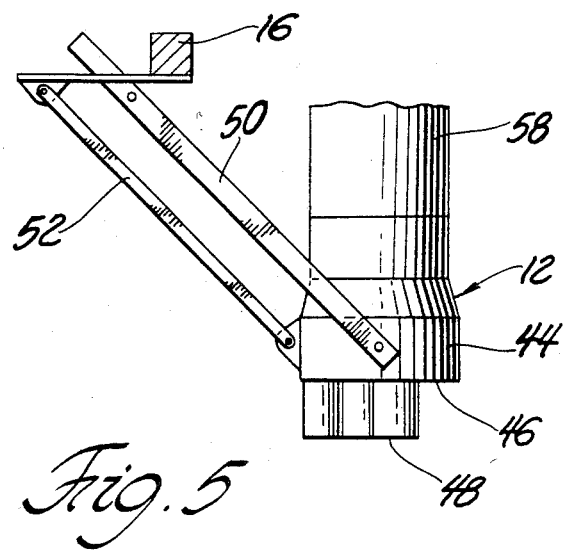
FIG. 5 is a fragmentary view taken substantially along lines 5—5 of FIG. 1.

The outer rotatable tube 26 has a first discharge opening 28 in a first discharge position for allowing air to be discharged transversely to the vehicle and a second discharge opening 28 parallel to the vehicle. Said another way, the second discharge opening 28 in the first discharge position is parallel to the vehicle while the first discharge opening 28 is discharging air transversely to the vehicle in the first discharge position. Further, the first discharge opening 28 is in the second discharge position parallel to the vehicle while the second discharge opening 28 is discharging air transversely to the vehicle. The rotatable outer tube 26 further comprises a first nozzle 30 directing the air from the first discharge opening 28 of the outer rotatable tube 26 upon the vehicle in the first discharge position and a second nozzle 32 directing the air from the second discharge opening 28 of the outer rotatable tube 26 upon the vehicle when the second nozzle 32 is in the second discharge position. FIG. 3 illustrates th outer rotatable tube 26 in the second discharge position. The second nozzle 32 extends radially outwardly from the outer rotatable tube 26 farther than the first nozzle 30. In other words, the outer rotatable tube 26 has the second nozzle 32 radially longer than the remaining first nozzle 30. The first nozzle 30 also has a larger vertical height with respect to the second nozzle 32 for drying taller vehicles. In other words, the first nozzle 30 is shorter in radial length and taller in vertical height for drying a taller vehicle, such as a van or truck, whereas the second nozzle 32 is longer in radial length and shorter in vertical height for drying shorter vehicles, such as a car. As illustrated in FIG. 1, the plurality of nozzles 30 and 32 are inclined or slanted and extend outwardly from the top portion 34 of the outer rotatable tube 26 farther than from the base portion 36 of the outer rotatable tube 26. Further, the plurality of nozzles 30 and 32 progressively widen from the base portion 36 to the top portion 34 of the rotatable outer tube 26. Put another way, the opening or aperture of the nozzle 30, 32 progressively widen from the base portion 36 to the top portion 34 of the outer rotatable tube 26. The fixed inner member 22 and outer rotatable tube 26 may be constructed of plastic or aluminum. The nozzles 30 and 32 could be produced in a flexible and inflatable fabric configuration.

Figure 7:
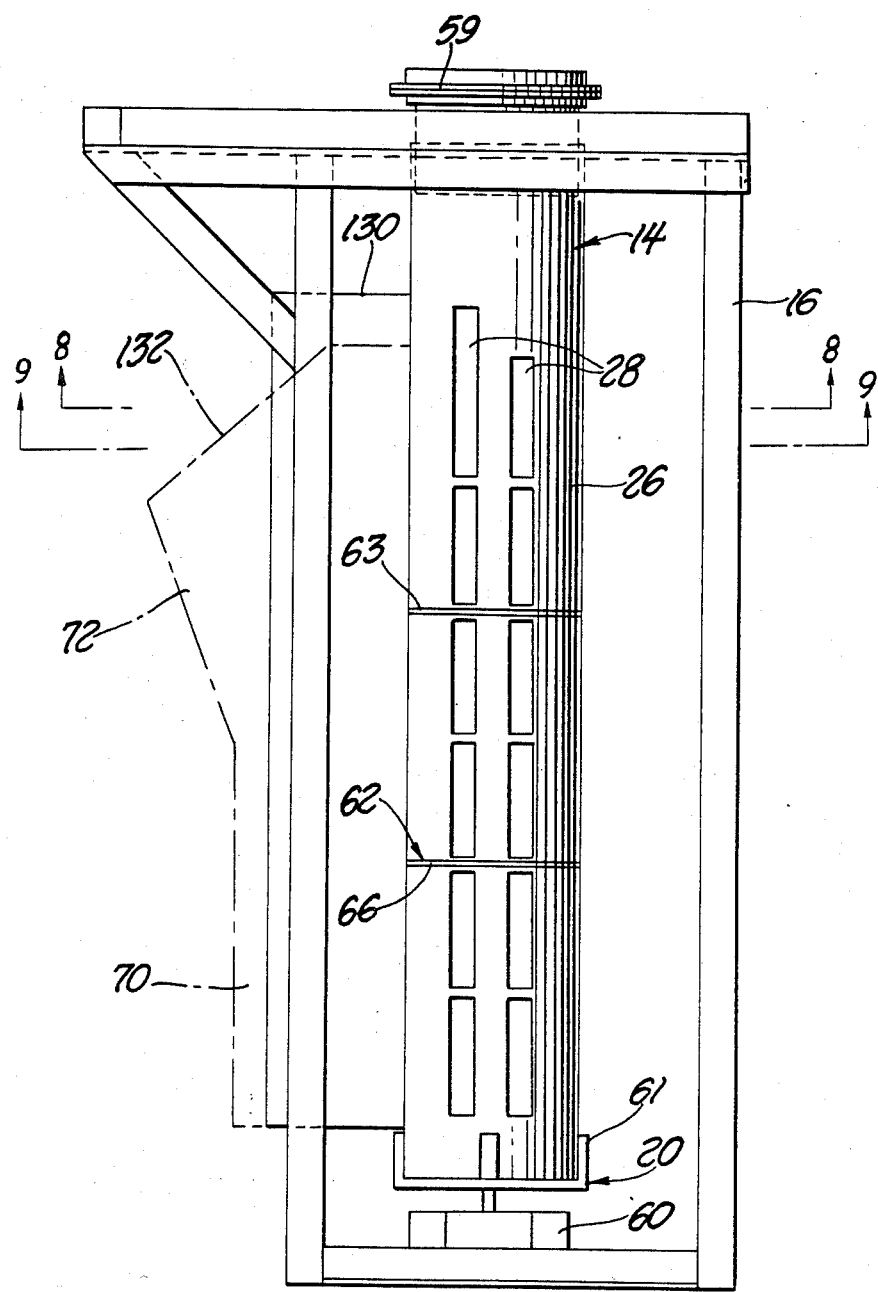
FIG. 7 is a cross-sectional view of the alternate embodiment of the side blowing means.

As an alternative, the nozzles 30, 32 may be defined as illustrated in FIG. 7. More specifically, the first nozzle 130 is defined as vertical and extends radially outwardly from the outer rotatable tube 26 equally from the top portion 34 to the base portion 36 of the outer rotatable tube 26. The second nozzle 132 is defined as having a vertical portion 70 which extends outwardly from the base portion 36 of the outer rotatable tube 26 and an inclined or slanted portion 72 which extends radially outwardly from the top portion 34 of the outer rotatable tube 26 farther than the vertical portion 70 of the second nozzle 132. In other words, the second nozzle 132 has a vertical portion 70 extending radially outwardly from the base portion 36 approximately half way toward the top portion 34 and a slanted portion 72 from the top of the vertical portion 70 to the top portion 34 of the outer rotatable tube 26. The nozzle 30, 32 130 and 132 are interchangeable between embodiments and may be used on all embodiments.

As illustrated in FIG. 3, the side blowing means 14 also includes sealing means 38 for preventing air from leaking past the aperture 24 of the fixed inner member 22. Said another way, the sealing means 38 allows air to exit the outer rotatable tube 26 through only one of the discharge openings 28 of the outer rotatable tube 26. The sealing means 38 comprises base seals 40 which are pressure tight on both sides of the aperture 24 of the fixed inner member 22, and vertical seals 42 pressure sealing the fixed inner member 22 and the outer rotatable tube 26 circumferentially positioned at the base portion 36 and top portion 34 of the outer tube 26. In other words, the vertical seals 42 are placed circumferentially between the inner fixed member 22 and the outer rotatable tube 26 at the base portion 36 and top portion 34 to pressure seal the side blowing means 14.

The rotatable means 20 comprises a rotary actuator or an air cylinder or an electric motor and a rotation belt 21 rotating the outer tube 26 with respect to the fixed inner member 22.

Figure 10:
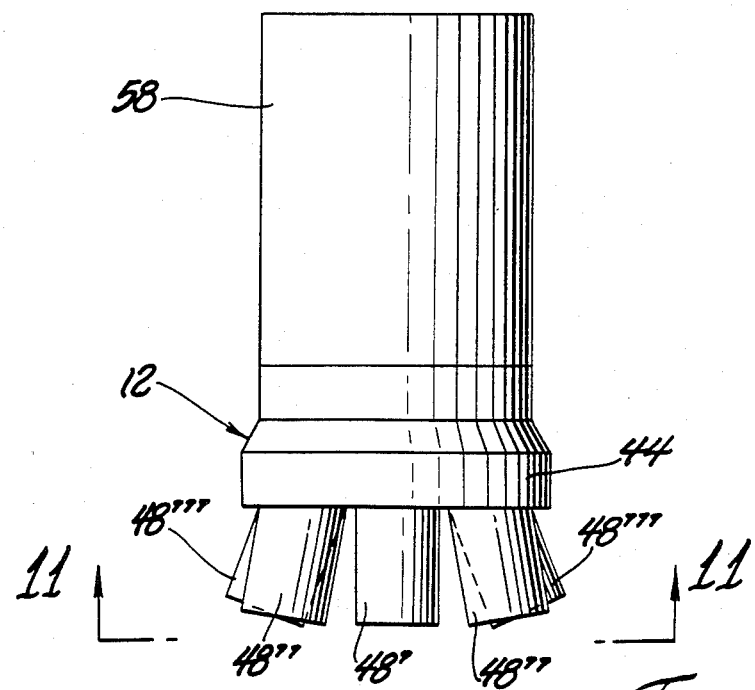
FIG. 10 is a fragmentary view of the alternate embodiment of the stop nozzle.
Figure 11:
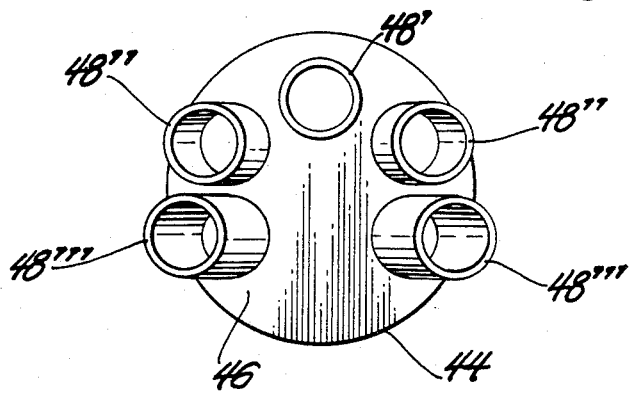
FIG. 11 is a fragmentary view taken substantially along lines 11—11 of FIG. 10.

The top blowing means 12 comprises a top nozzle 44 having a longitudinal axis and a discharge face 46 with at least one discharge orifice 48. The nozzle face 46 has a plurality of discharge orifices 48 configured in a "V" or arrow head with the point or pinnacle of the arrow facing in the opposite direction of vehicle travel through the frame 16. In other words, the arrowhead configuration of the discharge orifices 48 create a "plow effect" when stripping water from the surface of the vehicle as the vehicle travels through the tunnel of the frame in the opposite direction on the "V" facing. As illustrated in FIGS. 10 and 11, the top nozzle 44 includes a first row of discharge orifices 48' comprising one of the discharge orifices 48' which is vertical or parallel to the longitudinal axis of the top nozzle 44. The top nozzle 44 further comprises a second row of discharge orifices 48" which are inclined or slanted and extend outwardly from the axis of the top nozzle 44, preferably 10 degrees. The top nozzle 44 comprises a third row of discharge orifices 48''' which are inclined or slanted and extend outwardly from the axis of the top nozzle 44 farther than the second row of discharge orifices 48". The third row of discharge orifices 48''' extend outwardly from the axis of the nozzle 44 approximately twenty degrees. Alternatively, the first, second and third rows of discharge orifices, 48', 48" and 48''' may be vertical or parallel to the longitudinal axis of the top nozzle 44.

The top blowing means 12 includes pivotal arms 50 for mounting the top nozzle 44 to the support frame 16 for allowing the top nozzle 44 to be raised and lowered. The pivotal arms 50 are pivotally secured to allow the top nozzle 44 to be raised and lowered. The top blowing means 12 also includes a stabilizer bar 52 interconnecting the top nozzle 44 and the frame 16 for maintaining the nozzle face 46 in the same parallel relationship to the vehicle at all times. The top blowing means 12 may be raised and lowered by a surface follower or roller attached to the top nozzle 44 or with a variable air cylinder, or the like.

The air supply means 18 comprises a fan 54 for producing high-velocity air flow, and a blower motor 56 for rotating the fan 54. The air supply means 18 includes tubing or conduit 58 interconnecting the fan 54 and the top blowing means 12 and side blowing means 14 for delivering high velocity air flow to the top blowing means 12 and side blowing means 14. The conduit 58 may be constructed with flexible material.

Figure 6:
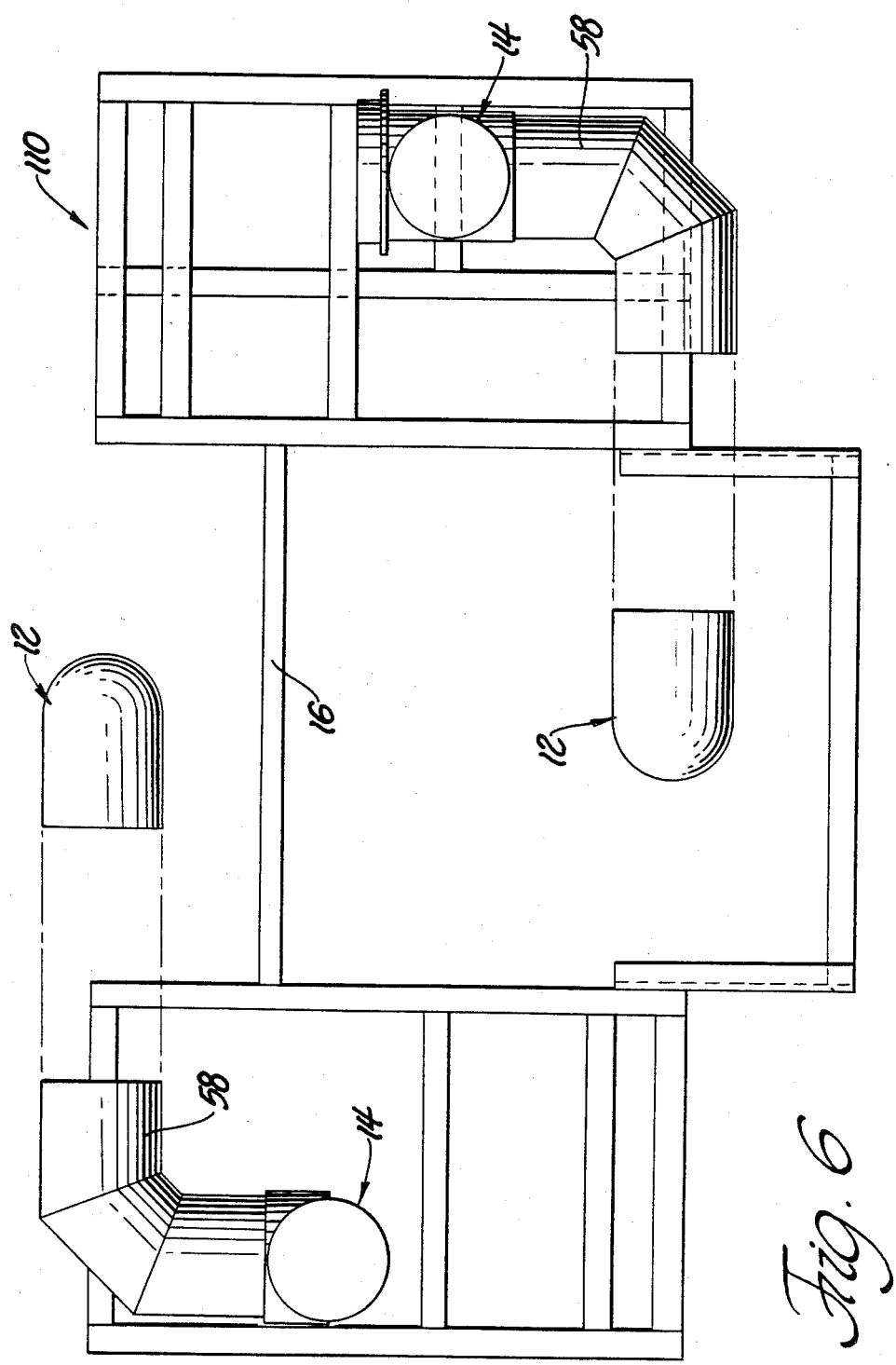
FIG. 6 is a top plan view of the alternate embodiment of the subject invention.

An alternative embodiment of the subject invention is generally shown at 110 in FIG. 6 wherein like numerals indicate like or corresponding parts. The side blowing means 14 is staggered or offset from each other along the length of the frame 16 through which the vehicle moves. As illustrated in FIG. 7, the frame 16 supports the side blowing means 14. The side blowing means 14 includes a connector 59 which is tubular and is connected to the fixed inner member 122 to connect the outer rotatable tube 26 to the conduit 58. Further, the outer rotatable tube 26 is supported by the rotating means 20. The rotating means 20 includes a rotary air cylinder 60 and a cross frame 61. The cross frame 61 includes "L" shaped angle members perpendicular or at 90 degrees to each other. The cross frame 61 prevents the outer rotatable tube 26 from moving laterally and supports the tube 26 upon the rotary air cylinder 60.

The outer rotatable tube 26 of the side blowing means 14 has at least one, preferably a plurality of, rectangular discharge openings 28 for allowing air to exit the outer rotatable tube 26. In other words, a series of rectangular discharge openings 28 lie along the same common longitudinal axis or in a vertical strip.

The side blowing means 14 includes balancing means 62 to equalize the pressure and the air flow from the top portion 34 to the base portion 36 of the outer rotatable tube 26. Said another way, the balancing means 62 equalizes the pressure distribution along the outer rotatable tube 26 to provide the same or equal amount of volumetric air flow along the length of the discharge opening 28. The balancing means 62 includes a first baffle 63 having a first circular aperture and a second baffle 66 having a second circular aperture. The second circular aperture of the second baffle 66 is smaller than the first circular aperture of the first baffle 63. In other words, the baffles 63, 66 are similar to a "ring" with the second aperture of the second baffle 66 smaller than the first aperture of the first baffle 63. The baffles 63, 66 are distributed along the longitudinal length of the outer rotatable tube 26 between adjacent or consecutive rectangular discharge openings 28.

Figure 8:
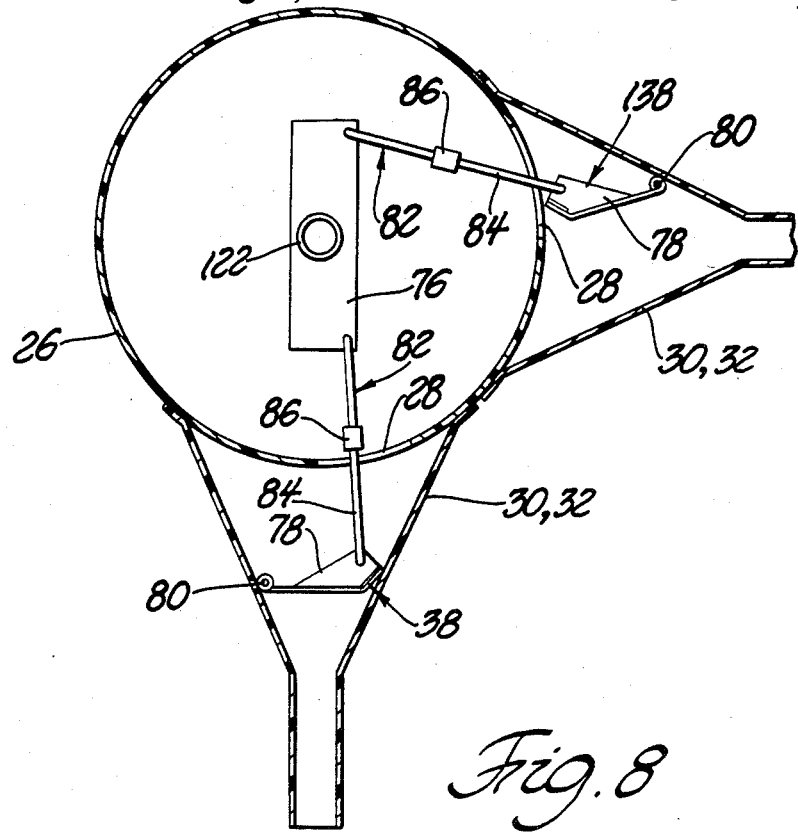
FIG. 8 is a cross-sectional view of the alternate embodiment of the subject invention taken substantially along lines 8—8 of FIG. 7.

As illustrated in FIG. 8, the fixed inner member 122 is tubular and similar to a pipe. The air from the air supply means 18, through the conduit 58, enters the outer rotatable tube directly, instead of entering the fixed inner member 122 as described in the preferred embodiment. Thus, in the alternate embodiment, air does not enter the fixed inner member 122 as illustrated in FIG. 8. Further, the fixed inner member 122 includes a platform portion 76 defined as a plate. The outer rotatable tube 26 includes sealing means 138 comprising a flap 78 pivotally disposed within the nozzle 30, 32 and a hinge means 80 for pivotally securing the flap 78 to the nozzle 30, 32. In other words, the flap 78 is similar to a "door" on a hinge to allow the flap 78 to rotate so that it can open or close the nozzle passageway. The sealing means 138 further comprises a connecting means 82 for opening and closing the flap 78 as the outer rotatable tube 26 is rotated. The connecting means 82 comprises a linkage 84 which interconnects the free end of the flap 78 and the platform portion 76 of fixed inner member 122. The connecting means 82 includes adjustment means 86 for increasing and decreasing the length of the linkage 84. In operation, as the outer rotatable tube 26 is rotated, the linkage 84 will pivot about the end connected to the platform portion 76 to geometrically open or close the flap 76.

Figure 9:
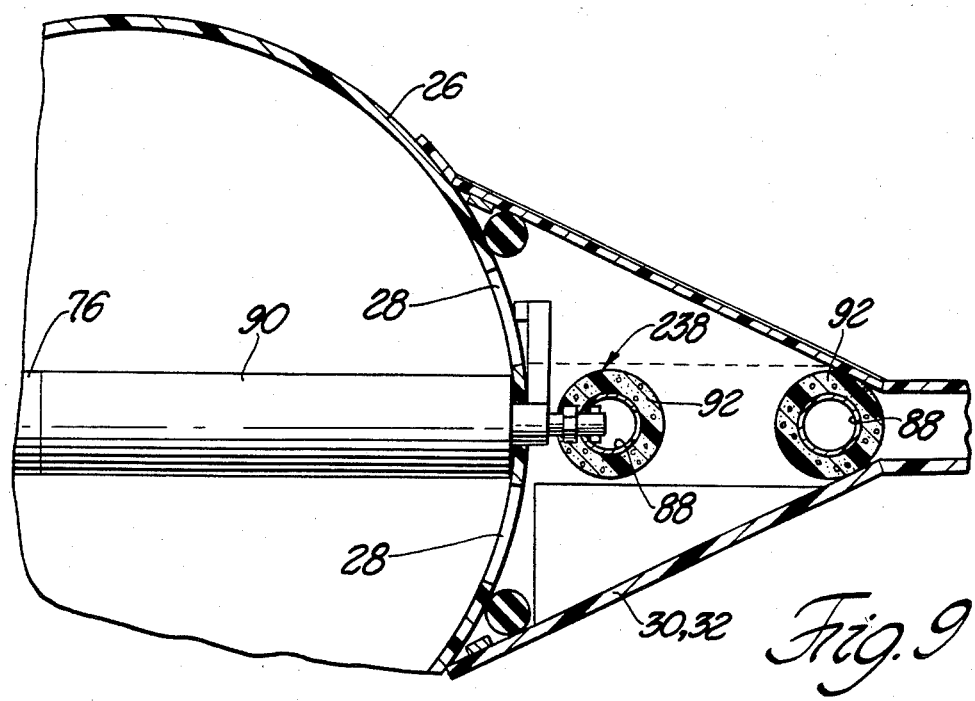
FIG. 9 is a fragmentary cross-sectional view of the alternate embodiment of the subject invention taken substantially along lines 9—9 of FIG. 7.

In a second alternate embodiment illustrated in FIG. 9, the sealing means is generally indicated at 238. The sealing means 238 includes a cylindrical tube 88 and an actuating means 90 pivotally supported by the platform portion 76 of the fixed inner member 122 and the outer rotatable tube 26 for extending and retracting the cylindrical tube 88. The actuating means 90 includes an air cylinder 90 supported by the outer rotatable tube 26 between a pair of discharge openings 128. The air cylinder 90 extends and retracts the cylindrical tube 88 for closing and opening the passageway of the nozzles 30, 32. The cylindrical tube 88 includes an absorption pad 92 circumferentially wrapped or disposed about the cylindrical tube 88. Thus, when the cylinder 90 extends the cylindrical tube 88 as the outer rotatable tube 26 is rotated to close the passageway of the nozzle 30, 32, the absorption pad 92 will be deformed slightly to form an air tight seal with the nozzle 30, 32.

In operation, the operator or automatic trip means will position the top blowing means 12 and side blowing means 14 to the correct position depending on the vehicle height and width.

The invention has been described in an illustrated manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced other wise than as specifically described.

What is claimed is:

1. A vehicle drying assembly (10) for air drying freshly washed vehicles comprising; side blowing means (14) for discharging air transversely to the vehicle for drying the sides of the vehicle, a frame (16) through which vehicles may be moved structurally supporting said side blowing means (14), air supply means (18) for supplying air under pressure to said side blowing means (14), said side blowing means (14) characterized by an outer rotatable tube (26) rotatable with respect to a fixed inner member (22,122) for alternatively discharging air through two openings (28) spaced circumferentially from one another about said outer rotatable tube (26), a first nozzle (30, 130) extending radially from said outer rotatable tube (26) around one of said openings (28) for directing the air flow therefrom, a second nozzle (32, 132) extending radially from said outer rotatable tube around the other of said openings (28), said outer rotatable tube (26) being rotatable between a first discharge position for discharging air from said first nozzle (30, 130) transversely to the vehicle with said second nozzle (32, 132) disposed in a non-discharge position and a second discharge position for discharging air from said second nozzle (32, 132) transversely to the vehicle with said first nozzle (30, 130) disposed in a non-discharge position, and sealing means (38, 138, 238) for preventing air flow out of each of said first (30, 130) and second (32, 132) nozzles when in said non-discharge positions.

2. An assembly as set forth in claim 1 wherein said outer rotatable tube (26) has at least two discharge openings (28) and a first position for allowing air flow to be discharged transversely to the vehicle and a second position parallel with the vehicle and a sealing means (38) for allowing air to exit said outer rotatable tube (26) through one of said discharge openings (28) of said outer rotatable tube (26) in said first position.

3. An assembly as set forth in claim 2 wherein said side blowing means (14) includes balancing means (62) disposed within said outer rotatable tube (26) for equalizing the pressure and velocity of the air from said air supply means (18) from said top portion (34) to said base portion (36) of said outer rotatable tube (26).

4. An assembly as set forth in claim 3 wherein said balancing means (62) includes a first baffle (63) having a circular aperture (64) and a second baffle (66) having a circular aperture (68) smaller than said circular aperture (64) of said first baffle (63).

5. An assembly as set forth in claim 2 wherein said fixed inner member (22) is tubular and has at least one aperture (24) for allowing air from said air supply means (18) to exit said fixed inner member (22).

6. An assembly as set forth in claim 5 wherein said sealing means (38) includes base seals (40) on both sides of said aperture (24) of said fixed inner member (22), and vertical seals (42) pressure sealing said fixed inner member (22) and said outer rotatable tube (26) positioned circumferentially at said base portion (36) and said top portion (34) of said outer rotatable tube (26).

7. An assembly as set forth in claim 2 wherein said air supply means (18) includes a fan (54) producing high velocity air flow, a blower motor (56) rotating said fan (54), and conduit (58) interconnecting said fan (54) and said side blowing means (14) for delivering high velocity air flow to said side blowing means (14).

8. An assembly as set forth in claim 7 wherein said outer rotatable tube (26) includes a first nozzle (30,130) directing the air flow from said discharge opening (28) of said outer rotatable tube (26) upon the vehicle in said first position.

9. An assembly as set forth in claim 8 wherein said outer rotatable tube (26) includes a second nozzle (32,132) directing the air flow from said discharge opening (28) of said outer rotatable tube (26) upon the vehicle in said first position.

10. An assembly as set forth in claim 9 wherein said sealing means (138) includes a flap (78) pivotally disposed within said nozzle (30,32), hinge means (80) for pivotally securing said flap (78) to said nozzle (30,32), and connecting means (82) for opening and closing said flap (78) as said outer rotatable tube (26) is rotated.

11. An assembly as set forth in claim 10 wherein said connecting means (82) includes a linkage (84) interconnecting the free end of said flap (78) and said fixed inner member (122) and adjustment means (86) for increasing and decreasing the length of said linkage (84).

12. An assembly as set forth in claim 9 wherein said sealing means (238) includes a cylindrical tube (88) and an actuating means (90) for extending and retracting said cylindrical tube (88) for closing and opening the passageway of said nozzle (30,32).

13. An assembly as set forth in claim 9 wherein said second nozzle (32) extends radially outwardly from said outer rotatable tube (26) farther than said first nozzle (30).

14. An assembly as set forth in claim 13 wherein said first nozzle (30) has a larger vertical height with respect to said second nozzle (32) for drying taller vehicles.

15. An assembly as set forth in claim 14 including rotatable means (20) for selectively rotating said outer rotatable tube (26) with respect to said fixed inner member (22).

16. An assembly as set forth in claim 15 wherein said side blowing means (14) includes balancing means (62) for equalizing the pressure and velocity of the air flow from said top portion (34) to said base portion (36) of said outer rotatable tube (26).

17. An assembly as set forth in claim 16 wherein said balancing means (62) includes a first baffle (63) having a circular aperture (64) and a second baffle (66) having a circular aperture (68) smaller than said circular aperture (64) of said first baffle (63).

18. An assembly as set forth in claim 17 wherein said sealing means (138) includes a flap (78) pivotally disposed within said nozzle (30,32), hinge means (80) for pivotally securing said flap (78) to said nozzle (30,32), and connecting means (82) for opening and closing said flap (78) as said outer rotatable tube (26) is rotated.

19. An assembly as set forth in claim 18 wherein said connecting means (82) includes a linkage (84) interconnecting the free end of said flap (78) and said fixed inner member (122) and adjustment means (86) for increasing and decreasing the length of said linkage (84).

20. An assembly as set forth in claim 17 wherein said sealing means (38) includes a cylindrical tube (88) and an actuating means (90) for extending and retracting said cylindrical tube (88) for closing and opening the passageway of said nozzle (30,32).

21. An assembly as set forth in claim 15 wherein said fixed inner member (22) is tubular and has at least one aperture (24) for discharging air flow from said conduit (58) from said air supply means (18).

22. An assembly as set forth in claim 21 wherein said sealing means (38) includes base seals (40) on both sides of said aperture (24) of said fixed inner member (22), and vertical seals (42) pressure sealing said fixed inner member (22) and said outer rotatable tube (26) positioned circumferentially at said base portion (36) and said top portion (34) of said outer rotatable tube (26).

23. An assembly as set forth in claims 19, 20 or 22 wherein said outer rotatable tube (26) has a top portion (34) and a bottom portion (36), said nozzles (30,32) progressively widen from said bottom portion (36) to said top portion (34) of said outer rotatable tube (26).

24. An assembly as set forth in claim 19, 20 or 22 wherein said nozzles (30,32) are defined as slanted to extend outwardly from said top portion (34) of said outer rotatable tube (26) farther than from said base portion (36) of said outer rotatable tube (26).

25. An assembly as set forth in claims 19, 20 or 22 wherein said second nozzle (132) is defined as having a vertical portion (70) extending outwardly from said base portion (36) of said outer rotatable tube (26) and an inclined portion (72) extending outwardly from said top portion (34) of said outer rotatable tube (26) farther than said vertical portion (70) of said second nozzle (132).

26. An assembly as set forth in claims 19, 20 or 22 wherein said first nozzle (130) is defined as vertical and extending outwardly from said outer rotatable tube (26).

27. An assembly as set forth in claim 15 including top blowing means (12) for downwardly discharging air above the vehicle for drying the top of the vehicle.

28. An assembly as set forth in claim 27 wherein said top blowing means (12) is structurally supported by said frame (16) and supplied air flow through said conduit (58) from said fan (54), said top blowing means (12) includes a top nozzle (44) having a discharge face (46) with at least one discharge orifice (48), pivotal arms (50) mounting said top nozzle (44) to said support frame (16), and stabilizer bar (52) interconnecting said nozzle (44) and said frame (16) for maintaining said nozzle face (46) in the same parallel relationship to the vehicle.

29. An assembly as set forth in claim 28 wherein said nozzle face (46) includes a plurality of discharge orifices (48) configured in an arrow head facing in the opposite direction of the vehicle travel through said frame (16).

30. An assembly as set forth in claim 29 wherein said top nozzle (44) has a longitudinal axis, said top nozzle (44) includes a first row of said discharge orifice (48') having only one of said discharge orifices (48) and being vertical, a second row of said discharge orifices (48") inclined and extending outwardly from said axis of said top nozzle (44), and a third row of discharge orifices (48''') inclined and extending outwardly from said axis of said top nozzle (44) farther than said second row of said discharge orifices (48").

31. An assembly as set forth in claim 30 wherein said side blowing means (14) includes balancing means (62) disposed within said outer rotatable tube (26) for equalizing the pressure and velocity of the air flow from said top portion (34) to said base portion (36) of said outer rotatable tube (26).

32. An assembly as set forth in claim 31 wherein said balancing means (62) includes a first baffle (63) having a circular aperture (64) and a second baffle (66) having a circular aperture (68) smaller than said circular aperture (64) of said first baffle (63).

33. An assembly as set forth in claim 30 wherein said fixed inner member (22) is tubular and has at least on aperture (24) for discharging said air flow from said tubing (58) from said air supply means (18).

34. An assembly as set forth in claim 33 wherein said sealing means (38) includes base seals (40) on both sides of said aperture (24) of said fixed inner member (22), and vertical seals (42) pressure sealing said fixed inner member (22) and said outer rotatable tube (26) positioned circumferentially at said base portion (36) and said top portion (34) of said outer rotatable tube (26).

35. An assembly as set forth in claim 32 wherein said sealing means (138) includes a flap (78) pivotally disposed within said nozzle (30,32), hinge means (80) for pivotally securing said flap (78) to said nozzle (30,32), and connecting means (82) for opening and closing said flap (78) as said outer rotatable tube (26) is rotated.

36. An assembly as set forth in claim 35 wherein said connecting means (82) includes a linkage (84) interconnecting the free end of said flap (78) and said fixed inner member (122) and adjustment means (86) for increasing and decreasing the length of said linkage (84).

37. An assembly as set forth in claim 32 wherein said sealing means (238) includes a cylindrical tube (88) and an actuating means (90) for extending and retracting said cylindrical tube (88) for closing and opening the passageway of said nozzle (30,32).

38. An assembly as set forth in claim 34, 36 or 37 wherein said outer rotatable tube (26) has a top portion (34) and a bottom portion (36), said nozzles (30,32) progressively widen from said bottom portion (36) to said top portion (34) of said outer rotatable tube (26).

39. An assembly as set forth in claims 34, 36 or 37 wherein said nozzles (30,32) are defined as slanted to extend outwardly from said top portion (34) of said outer rotatable tube (26) farther than from said base portion (36) of said outer rotatable tube (26).

40. An assembly as set forth in claims 34, 36 or 37 wherein said second nozzle (132) is defined as having a vertical portion (70) extending outwardly from said base portion (36) of said outer rotatable tube (26) and an inclined portion (72) extending outwardly from said top portion (34) of said outer rotatable tube (26) farther than said vertical portion (70) of said second nozzle (132).

41. An assembly as set forth in claims 34, 36 or 37 wherein said first nozzle (130) is defined as vertical and extending outwardly from said outer rotatable tube (26).

42. An assembly as set forth in claims 12, 20 or 37 wherein said actuating means (90) includes an air cylinder (90).

43. An assembly as set forth in claims 12, 20 or 37 wherein said cylinder (88) includes an absorption pad (92) circumferentially about said cylinder (88).

44. An assembly as set forth in claims 19, 20, 36 or 37 wherein said rotatable means (20) includes a support member (74) supporting said outer rotatable tube (26) and an air cylinder (76) connected to said support member (74) for rotating said outer rotatable tube (26).

45. An assembly as set forth in claims 22 or 34 wherein said rotatable means (20) includes an air cylinder (20) and belt (21) for rotating said outer rotatable tube (26) with respect to said fixed inner member (22).

* * * * *

UNITED STATES PATENT AND TRADEMARK OFFICE
CERTIFICATE OF CORRECTION

PATENT NO. : 4,683,668

DATED : August 4, 1987

INVENTOR(S) : Leonard J. Hondzinski and Robert A. Wrest

It is certified that error appears in the above-identified patent and that said Letters Patent is hereby corrected as shown below:

Column 2, line 12, "stop" should read --top--.

Column 3, line 2, "th" should read --the--.

Column 3, line 44, after the numeral "32" should be a comma --,--.

Column 6, line 11, "other wise" should read --otherwise--.

Claim 2 is cancelled.

Column 6, claim 3, line 49, claim numeral "2" should read --1--.

UNITED STATES PATENT AND TRADEMARK OFFICE
CERTIFICATE OF CORRECTION

PATENT NO. : 4,683,668

DATED : August 4, 1987

INVENTOR(S) : Leonard J. Hondzinski and Robert A. Wrest

It is certified that error appears in the above-identified patent and that said Letters Patent is hereby corrected as shown below:

Column 7, claim 16, line 47, after "means (62)" should be inserted --disposed within said outer rotatable tube (26)--.

Claims 8 and 9 are cancelled.

Column 7, claims 10, 12 and 13, lines 19, 30, and 35, claim numeral "9", each occurence, should read --7--.

Column 8, claim 24, line 20, "claim" should read --claims--.

Column 9, claim 33, line 7, "on" should read --one--.

On the title page "45 Claims" should read --42 Claims--.

Signed and Sealed this

Nineteenth Day of April, 1988

Attest:

DONALD J. QUIGG

Attesting Officer

Commissioner of Patents and Trademarks